July 5, 1927.
E. GASE
1,634,324
DIAL SCALE AND SIMILAR APPARATUS
Filed Dec. 4, 1923
5 Sheets-Sheet 1
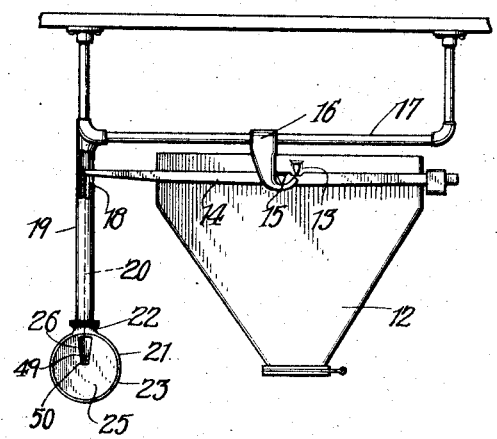
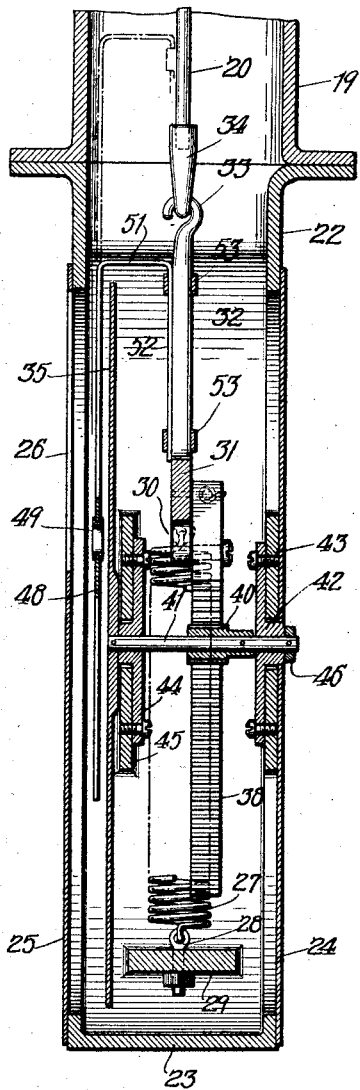
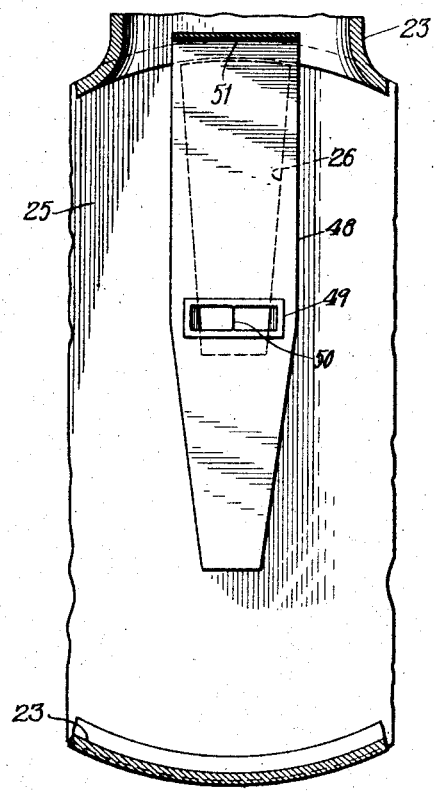
Inventor
EUGENE GASE.
By His Attorney
Newell and Spencer.

July 5, 1927.

E. GASE 1,634,324

DIAL SCALE AND SIMILAR APPARATUS

Filed Dec. 4, 1923   5 Sheets-Sheet 2

Inventor
EUGENE GASE.
By His Attorney
Newell and Spencer.

July 5, 1927.
E. GASE
1,634,324
DIAL SCALE AND SIMILAR APPARATUS
Filed Dec. 4, 1923
5 Sheets-Sheet 3
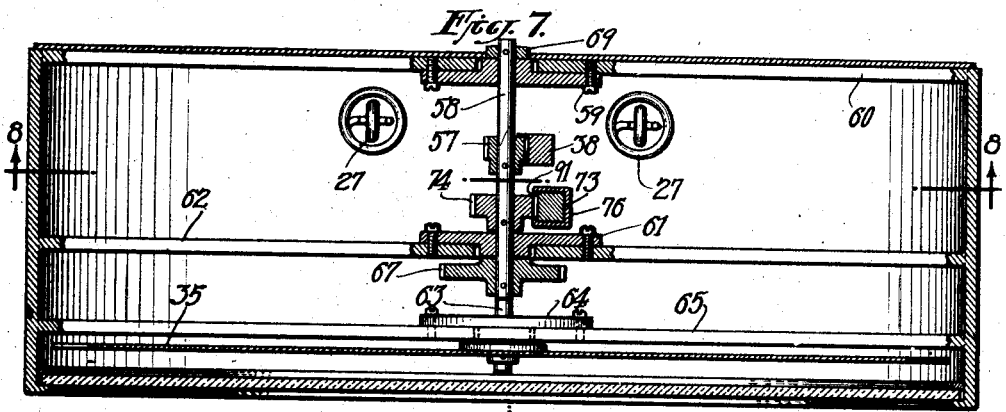
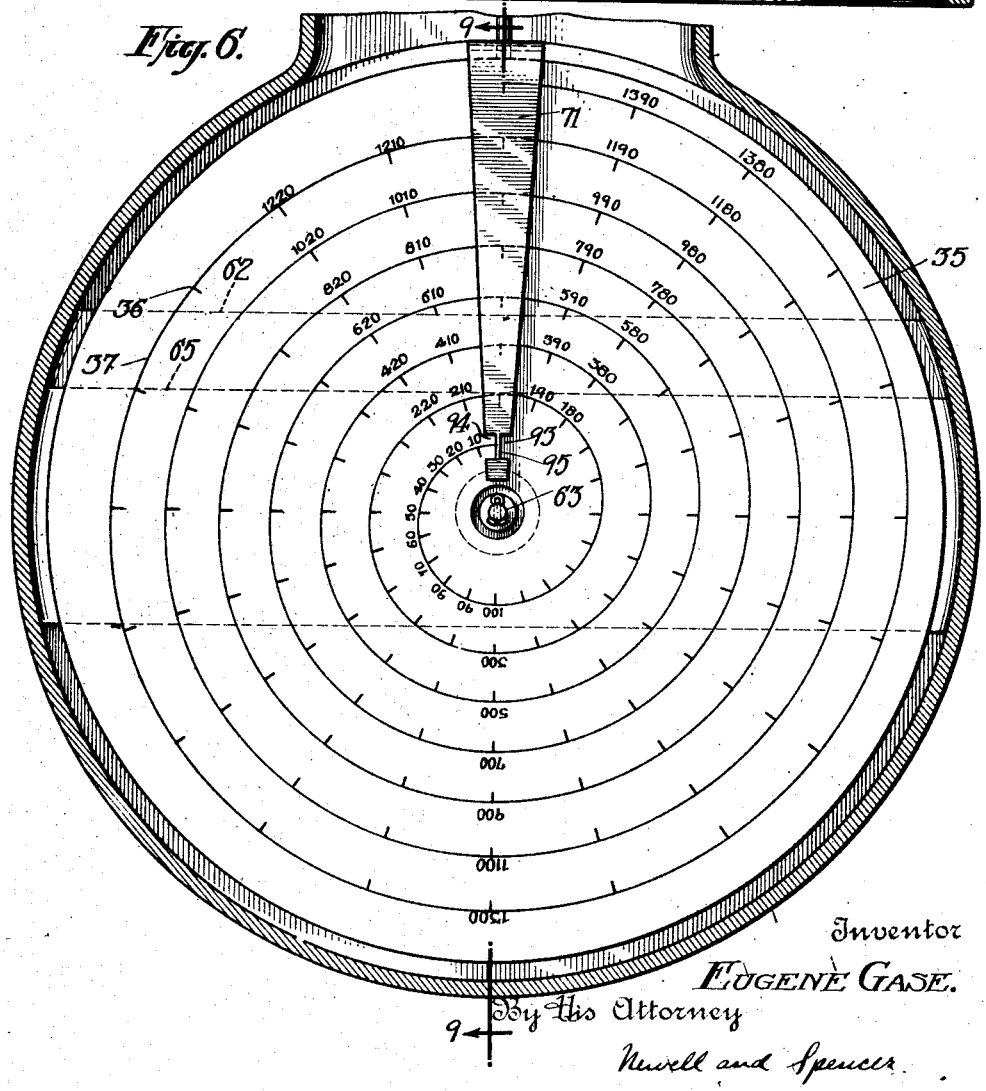
Inventor
EUGENE GASE.
By his Attorney
Newell and Spencer July 5, 1927.

E. GASE 1,634,324

DIAL SCALE AND SIMILAR APPARATUS

Filed Dec. 4, 1923   5 Sheets-Sheet 4

Inventor
EUGENE GASE.
By his Attorney
Newell and Spencer.

July 5, 1927.

E. GASE 1,634,324

DIAL SCALE AND SIMILAR APPARATUS

Filed Dec. 4, 1923

Inventor

EUGENE GASE.

By His Attorney

Newell and Spencer

Patented July 5, 1927.

1,634,324

UNITED STATES PATENT OFFICE.

EUGENE GASE, OF SAGINAW, MICHIGAN, ASSIGNOR TO BAKER PERKINS COMPANY, INC., OF SAGINAW, MICHIGAN, A CORPORATION OF NEW YORK.

DIAL SCALE AND SIMILAR APPARATUS.

Application filed December 4, 1923. Serial No. 678,384.

This invention relates to dial scales and similar apparatus, and more particularly to a dial scale adapted to be employed in weighing apparatus to indicate weight, or in other apparatus where deflection or movement of a moving element is to be measured with relation to some fixed point, the reading being indicated upon a dial having intervals or numerals arranged on a spiral scale, with which an indicator cooperates with relative movement to the scale to indicate the reading thereon.

In dial scales and similar apparatus of the general type heretofore employed, the degrees are marked on a dial plate, the center of which lies in the axis of a shaft carrying a pointer which is given a single revolution relative to the dial for the maximum travel of the moving object. The movement of the object is represented in degrees arranged in a circular line on the dial plate corresponding to a single rotation of the pointer relative to the dial, and the distance traversed by the pointer on this line must be correspondingly short, particularly when the dial plate is of small diameter. The degrees must therefore be closely spaced, making the exact position of the pointer relative to the scale difficult to read and limiting the accuracy with which small movements of the actuating object may be read, or making it impossible to accurately measure them.

These disadvantages and limitations are obviated by my present invention, an object of which is to provide a scale capable of indicating the movement of the actuating or moving element more accurately and perfectly, particularly when the total amount of movement is small.

Another object of the invention is to provide a dial scale in which the relative movement of the dial scale and pointer or indicator element is not limited to a single revolution.

A further object of the invention is to provide a dial scale having the measuring intervals or degrees arranged in a spiral and having a pointer or indicator element movable successively to and from the axis of the scale simultaneously with the rotation of the scale.

Further objects of the invention are to provide a scale mechanism in which a measuring line or a path of any desired length or number of turns may be utilized in connection with a moving element having a limited movement to measure deflection, movement, or weight of an object.

With these and other objects in view, the invention comprises the apparatus described and set forth in the following specification and claims.

The various features of the invention are illustrated in the accompanying drawings, in which;

Fig. 1 is a view in elevation of a weighing machine, of the type generally used for weighing flour in bakeries, illustrating the arrangement of a dial scale embodying a form of the invention;

Fig. 2 is a front view of a dial plate and indicator embodying a form of the invention in which indicating degrees are arranged in a spiral of three turns;

Fig. 3 is a sectional view taken to the right of the indicator in Fig. 2, showing the indicator and the opening in the dial casing to the rear thereof, which is indicated in broken lines;

Fig. 4 is a sectional elevation in a plane at right angles to the dial carrying shaft immediately back of the dial, showing the shaft actuating mechanism;

Fig. 5 is a sectional elevation of the dial and actuating mechanism taken on the line 5—5 of Fig. 4;

Fig. 6 is a front view of a spiral dial plate similar to that of Fig. 2 but in which the number of turns of the spiral is increased to seven turns;

Fig. 7 is a horizontal sectional view through the dial and casing of Fig. 6, showing a plan view of a modified form of dial operating mechanism adapted for the dial of Fig. 6;

Figure 8:
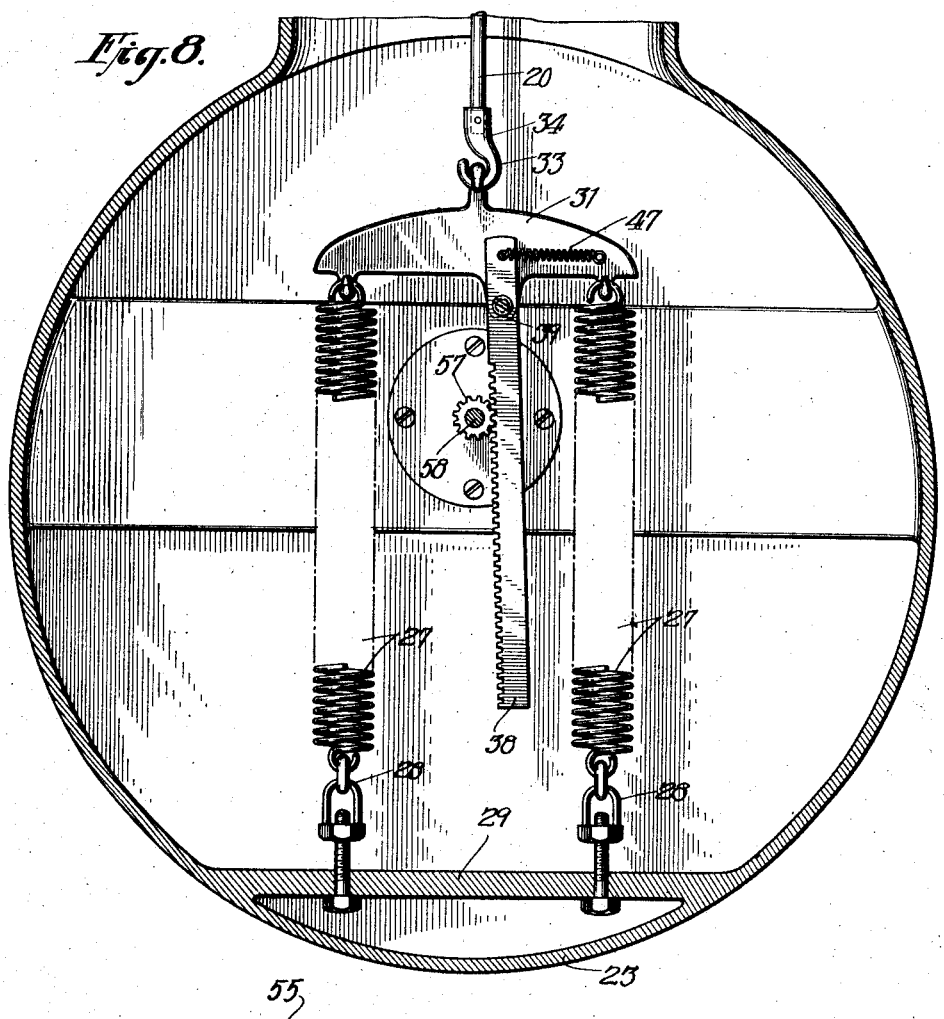
Fig. 8 is a vertical sectional view through the dial casing taken on the line 8—8 of Fig. 7, showing in elevation the mechanism by which the main shaft of the dial operating mechanism is driven from the weighing rod of the weighing apparatus.

In my present invention, the movement of a weighing rod or other moving element, the distance of whose movement is to be indicated, is transmitted to a rotatable dial in such a manner as to cause the dial to rotate through several rotations as the moving element traverses its maximum distance. The movement of the moving element is indicated on the dial by means of marks or degrees arranged in a spiral path on the dial, the spiral having the same number of turns as the dial is rotated by the maximum movement of the moving element. The distance to which the dial is rotated and, accordingly, the distance through which the moving element has moved is thereby indicated by the length of the spiral which measures the amount of rotation taken with reference to a fixed line or point, or in other words by the length of the portion of the spiral which has the indicating mark or point. In order to indicate on which of the several turns of the spiral the distance is to be read for any angular position of the dial, an indicating pointer is arranged to move to and from the axis of the dial in a path fixed with relation to the rotation of the dial and preferably in a straight line, radial to the axis of rotation. The movement of this pointer is simultaneous with the rotation of the dial and at such a rate that its distance from the center of the spiral is equal to the radius vector of the spiral, or to the distance of the point on the spiral under the fixed line from the center, the maximum movement in a radial direction being equal to the radial distance between the ends of the spiral. A reading or indicating element on the pointer is thus always on the part of the spiral which indicates the distance moved by the moving element.

In the simplest case, illustrated in Figs. 2–5, the radial distance between the ends of the spiral is equal to the distance traversed by the moving element, while in the example shown in Figs. 6–11, the radial distance is greater than the distance traversed by the moving element, thus enabling the spiral path to be lengthened and the movement of the element to be indicated more closely or accurately.

Referring more particularly to the drawings, Figs. 1–5, the invention is illustrated as applied to a flour weighing apparatus having a weighing hopper 12 suspended by means of rods or lugs 13 projecting sidewise therefrom and suspended from the rear part of a scale beam 14, which is forked to provide a branch for each rod or lug. The balance is constructed according to the steelyard principle, each branch of the forked scale beam having a rod 15 which forms the fulcrum of the balance and is supported by a bracket 16 carried on a framework 17 attached to the ceiling of the weighing room or other supporting structure.

The front of the scale beam 14 projects through an opening 18 in a tube 19 depending from the framework 17 and is connected to a weighing rod 20 extending downwardly within the tube 19 to within a dial casing 21 mounted on the lower end of the tube by means of an attaching neck 22. The dial casing 21 is formed of an annular part 23 joining the flanged neck 22, a rear plate 24, and a front plate 25 having a triangular opening 26 through which the dial and pointer for indicating the weight of material in the hopper 12 may be observed.

The upward force transmitted from the weight of the flour in the hopper 12 to the weighing rod 20 is directed to elongate a pair of tension springs 27 which are connected at their lower ends by means of screw hooks 28 to a cross bar 29 secured to, or integral with, the annular rim 23 of the dial casing, and are connected by means of hooks 30 at their upper ends to a plate 31 having an upwardly extending, reinforced stem 32 which is, in turn, connected to the weighing rod 20 by means of a hook 33 at its upper end, which hooks over or grasps a hook 34 secured to the lower end of the rod 20. The elongation of the springs 27 and the movement of the plate 31 and weighing rod 20 are proportional to the weight of the material in the weighing hopper 12 and therefore indicates the weight of the material in the weighing hopper.

The movement of the plate 31 is transmitted to a dial 35 in the dial casing in such a manner that the dial is given several revolutions as the plate moves through its maximum distance of movement. In Figs. 2–5, for example, the dial is rotated three times for the maximum distance through which the plate 31 moves. The distance of movement of the plate 31 is indicated on the dial 35 by means of marks or degrees 36 arranged in a spiral 37 having a number of turns equal to the number of rotations of the dial. The degrees 36 are accordingly spaced along the spiral path 37 distances corresponding to equal angular movements of the dial, and each revolution of the dial and the corresponding turn of the spiral, indicates one third of the maximum weight, which corresponds to the maximum distance of travel of the plate 31. For example, if the maximum weight corresponding to three turns of the dial be 1200 pounds, each turn of the spiral will indicate 400 pounds and the degrees of each spiral will indicate corresponding portions of this amount.

The movement of the plate 31 is transmitted to the dial 35 through a rack 38 pivoted on a bracket 39 on the plate 31 and meshing with a pinion 40 fixedly mounted on a shaft 41 on which the dial 35 is fixedly mounted, the pitch circle of the pinion 40 having a circumference equal to one third of the length of maximum movement of the plate 31 and rack 38. The shaft 41 is journaled at its rear end in a bearing 42 mounted on a rear cross bar 43 extending across the central portion of the casing and, at its front end is journaled in a bearing 44 similarly mounted in a cross bar 45 extending across the central portion of the casing immediately back of the dial 35. The shaft is kept in proper position by the dial 35 at its front end and by a collar 46 on the end projecting rearwardly from the bearing 42. To keep the rack 38 meshed with and in complete working contact with the pinion 40, the rack is gently pressed against the pinion by means of a spring 47 fastened at one end to the top part of the rack and at its other end to the plate 31.

The movement and position of the dial 35 are indicated by means of an indicator 48 extending vertically immediately back of the front plate 25 and opening 26 of the dial casing and immediately in front of the dial 35. The indicator 48 is arranged to move vertically with movements of the plate 31 and rack 38 from a fixed point or a zero line, so as to maintain a fixed relation between its movement and the angular movement of the dial. The indicator is of sufficient width to overlap the opening 26 and is provided with a window 49 through which a small portion of the dial is visible. The window 49 is longer in its horizontal than in its vertical dimension and is provided with a dark vertical line 50 which is so positioned that when the hopper 12 is unloaded the line 50 is at the zero mark of the dial scale. As the dial rotates, the mark or degree of the spiral under the line 50 indicates the distance along the spiral to the zero mark and, accordingly, the weight in the hopper 12.

As the dial rotates from the zero mark, the radial distance from the point of the spiral under the mark 50 to the center of the dial, or the radius vector of the spiral at this point, increases and this increase from the zero mark to the end mark or degree on the spiral is equal to the extension of the springs 27, or, in other words, to the movement of the plate 31, stem 32 and weighing rod 20 from unloaded to fully loaded position. It is apparent that as the dial rotates the indicator 48 moves a corresponding amount in a vertical direction so as to follow the line of the spiral and to keep the window 49 in proper position in front of that turn or portion of the spiral that contains the correct weighing mark. Inasmuch as the increase in radius of the portion of the spiral under the line 50 is equal to and simultaneous with the vertical movement of the plate 31 and stem 32, the indicator 48 is given its correct vertical movement by attaching it directly to the stem 32 by means of an arm or extension 51, extending horizontally from the top portion of the indicator 48 rearwardly to the stem 32, and thence downwardly as a stem 52 lying adjacent the stem 32 and fastened thereto by means of clamps 53.

The indicator is so proportioned and positioned that when it is in zero position the extension 51 is just above, and just clears, the upper edges of the dial 35 to permit the free rotation of the dial, and, in the full load position the window 49 is sufficiently high to permit the end of the spiral to be seen. The upper position of the indicator is indicated in broken lines in Fig. 5.

The greater the distance of the outer end point of the spiral from its center, and the more numerous its turns, and also the smaller the distance of the turns from each other, the greater, on a scale covering the same interval, will be the distance between two adjacent degrees, and the exactitude of readings thereon.

If it is desired to increase the number of turns on the dial with a given movement, the ratio of transmission from the moving element to the dial may be increased, as illustrated in Figs. 6 to 11. In this case, the degrees 36 are arranged on a spiral 37 of seven turns, the dial being made correspondingly larger and being given seven revolutions between zero and fully loaded positions. The arrangement of the weighing rod 20, plate 31 and springs 27 is substantially the same as in Figs. 2 to 5, the hooks 28, by which the ends of the springs 27 are secured, however, being, in this example, illustrated in the form of clevis hooks. The size of the dial casing is, however, enlarged to accommodate the larger size of dial and, in place of the front plate 25 and window 49, the front of the annular rim part 23 is closed by a glass plate 54. The casing is also provided with a neck portion 55 of rectangular cross section having flanges similar to those of the neck 22 and having an opening in its front wall closed by a plate 56 of metal or glass. It is to be understood, however, that other forms of casings may be used.

The weighing apparatus in this example is designed to hold 1400 pounds, each one of the seven turns on the dial covering weights of 200 pounds, and the ratio of the radial distance between the zero and 1400 marks to the elongation of the springs 27 and maximum movement of the plate 31 being 14 to 9. The movement of the plate 31 is therefore multiplied in transmission to the dial 35 to cause the dial to make seven revolutions for the maximum movement of the plate.

For this purpose, the dial shaft is not driven directly from the plate 31 by the rack 38 but the rack meshes directly with a pinion 57 mounted on a main shaft 58 from which the dial shaft and dial are driven through a suitable reduction gearing. The shaft 58 is journaled at its rear end in a bearing 59 mounted in a cross bar 60 extending horizontally across the annular part 23 of the dial casing at the rear of the casing, and is journaled at, or a short distance back of, its front end in a bearing 61 mounted in a cross bar 62 extending horizontally across the casing rim 23 at an intermediate position. The dial 35 is mounted on a dial shaft 63 journaled in and extending through a bearing 64 mounted in a cross bar 65, extending horizontally across the dial casing immediately back of the dial 35, and at its rear end is journaled in a bearing 66 mounted in the cross bar 62, and integral with the bearing 61. The shaft 63 is driven from the shaft 58 by means of a driving gear or pinion 67 fixed on the shaft 58 and meshing with a driven gear 68 on the shaft 63. The shaft 58 is retained in position lengthwise in its bearings by a collar 69 at its rear end and, at its front end, by the pinion 67, and the shaft 63 is retained in position by a collar 70 at its rear end and by the dial 35 at its front end.

The rack 38 and pinion 57 and the pinions or gears 67 and 68 are so proportioned that the dial is rotated the required number of times for the maximum movement of the rack. In the above instance, the pitch circle of the pinion 57 has a circumference of one half the length of movement of the rack and the diameter of the pitch circle of the gear 67 is therefore three and one half times the diameter of the pitch circle of the gear 68. By suitably proportioning this gearing the dial 35 may be given any number of rotations desired regardless of the length of maximum extension of the springs 27 or of the maximum limits of movement of the weighing rod 20.

In order to provide sufficent space for the several turns of the dial spiral without crowding, the radial distance between the zero and the final mark or degree on the dial is made larger than the length of maximum movement of the weighing rod, particularly when this movement is small or limited. The movement of the indicator must be accordingly increased over the movement of the weighing rod in order that it may move radially at a rate equal to the increase of the distance from the center of the dial to the point on the spiral under the indicator.

For this purpose, an indicator 71, positioned between the dial 35 and the front plate 54 similarly to the position of the indicator 48 of the embodiment in Figs. 2–5, is attached at its upper end to a horizontal portion of a holder 72 which extends horizontally backward and then downwardly and is mounted on the upper end of a rack 73 which meshes with a pinion 74, rigidly mounted on the shaft 58. The holder 72 is mounted on the rack 73 by riveting or bolting the lower part of its vertical portion to a tongue 75 projecting upwardly from the upper end of the rack. The pitch circles of the pinions 57 and 74 have diameter ratios of one to three and one half so that the indicator travels upwardly and downwardly from the zero mark to the final mark on the spiral scale while the rack 38 moves through its maximum length of movement.

The rack 73 is held in position to mesh with the pinion 74 in its vertical movement by an enclosing guide tube 76 in which the rack slides and which has a slot through which a portion of the pinion 74 may project to mesh with the rack. The guide tube 76 is fixed at its lower end by a screw bolt 77 in the cross bar 29 and is rigidly held at its upper end on a bracket 78 mounted on a side wall 79 of the neck portion 55 of the dial casing. The weight of the rack 73 in the tube 76 is compensated for by a counterweight 80 secured by means of an eyebolt 81 to one end of a flexible rope 82, preferably made of thin wire, which is passed over a pulley 83 and secured at its other end to an eyebolt 84 screwed into the top of the rack bar 73. The pulley 83 is mounted on a shaft 85 journaled in bearings in brackets 86 projecting upwards from the two side plates 87 of the bracket 78. The side plates 87 are mounted on a projecting solid portion of the bracket 78 by means of bolts 89 and enclose at their end portions the top of the guide tube 76, which is rigidly attached to them by means of screws 90. The rack 73 is between the pinion 74 and the wall 79 of the neck 55 on which the bracket 78 is mounted, both this wall and the rack thereby being positioned on the same side of the pinion 74.

Figure 11:
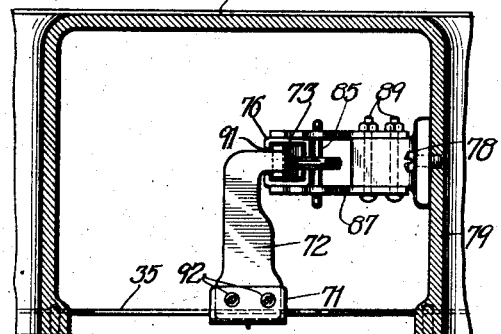
Fig. 11 is a plan of the mechanism illustrated in Fig. 10 and a section of the dial casing taken on the line 11—11 of Fig. 10.
Figures 9, 10:
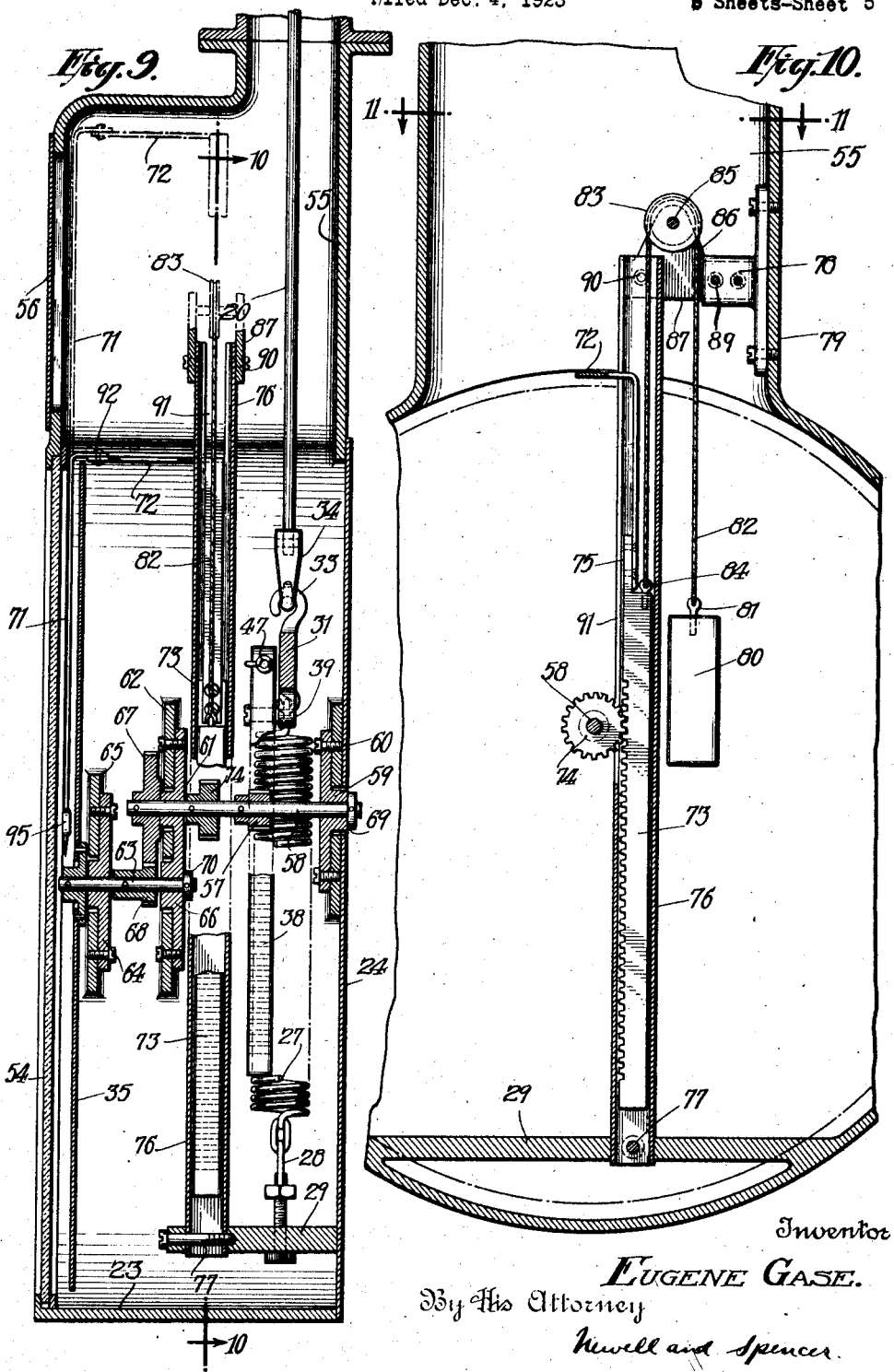
Fig. 9 is a vertical sectional view of the dial casing and operating mechanism taken on the line 9—9 of Fig. 6.
Fig. 10 is a sectional elevation of a portion of the dial casing and actuating mechanism taken on the line 10—10 of Fig. 9.

The indicator holder 72 by which the indicator is mounted on the rack 73 is formed of a stiff piece of metal rising vertically upwards from the tongue 75 of the rack and bent at a right angle at such a point that, when the rack 73 is in the position corresponding to no load on the weighing hopper, the horizontal part of the indicator holder is slightly higher than the top of the dial plate 35 so that the holder cannot interfere with the rotation of the dial. The vertical part of the holder 72 is sufficiently narrow to pass easily up and down together with the rack 73 within the guide tube 76. The tube 76 has a slot 91 through which the horizontal part of the holder 72 extends, the holder being narrowed or notched at this place so that it slides readily in the slot. The horizontal portion of the holder extending from the tube is then bent forwardly at a right angle and widened to the width of the indicator 71, as shown in Fig. 11, the center line of the holder being in a plane with the axis of the dial shaft 63. The indicator is fastened to the forward end portion of the holder 72 by means of screw bolts 92 and the holder and indicator are so positioned that the indicating mark of the indicator stands over the zero mark of the spiral scale when the weighing hopper is not loaded and moves upwardly in a perpendicular direction radial to the center of the spiral scale until the indicating portion of the indicator stands over the 1400 mark of the dial, the uppermost position of the indicator and holder being indicated in broken lines.

A modified form of indicator is illustrated in connection with this modification. In this form of indicator, the vertical, front portion of the indicator, as shown in Fig. 6, comprises a thin metal plate, wide at its upper portion and tapering downwardly and narrower at its lower end. The indicator plate is cut inwardly near its lower end as at 93 and 94, and pressed inwardly to form a thin strip 95 vertical to the surface of the plate and acting as the indicating line of the apparatus. The plate 71 is preferably painted in black, while the thin strip 95 is a very bright red, an arrangement which greatly facilitates the reading of the scale.

The scale in this modification operates in the same general manner as the scale shown in Figs. 2–5. When the hopper 12 is being loaded, the dial 35 turns, and at the same time, the indicator 71 rises at such a rate that the indicating portion 95 is always on that turn of the spiral scale corresponding to the weight of material in the hopper, the degrees on the spiral scale passing successively under the strip 95, which gives at any moment the weight of material in the hopper 12.

With this modification, a greater latitude and freedom in the number and spacing of the turns of the spiral is permitted and, accordingly, the size of the dial and the accuracy and precision with which the degrees or marks of the scale may be read is independent of the extent of movement of the weighing rod or other moving element to which the invention may be applied.

It is to be understood that various changes or modifications may be made in the device, as will be apparent to those skilled in the art, without departing from the spirit or scope of the invention.

Having described the invention, what I claim and desire to secure by Letters Patent is:

1. In a weighing apparatus, a balance having a weight arm and a weighing arm, means for applying the material to be weighed to the weight arm, spring means attached to the weighing arm adapted to apply a force to the weighing arm in direct proportion to the deflection of the said arm, dial means for registering the deflection of the said arm in proportion to the weight applied, the said means comprising a dial, a series of divisions on the said dial arranged in a spiral thereon so as to subtend equal angles; means for rotating the said dial in proportion to the said deflection and means for indicating the numbers on the dial corresponding to the deflection of the weighing arm and the weight of material on the weight arm.

2. In a weighing apparatus, a dial having divisions thereon arranged in the form of a spiral having a plurality of turns, said divisions being so spaced as to subtend equal angles, means for rotating said dial in proportion to the weight on said apparatus, an indicator, means for moving said indicator transversely to said dial to attain movement thereof proportional to the rotation of said dial, whereby said indicator will follow said spiral during the rotation of the dial to indicate the said weight.

3. Apparatus of the type described which comprises, a moving element, a dial, means for transmitting movement from said moving element to said dial to rotate said dial at an angular velocity proportional to the movement of said moving element, an indicator, and means for moving said indicator over said dial at a radial speed proportional to the movement of said moving element.

4. Apparatus of the type described which comprises, a moving element, a dial, means for driving said dial from said moving element at an angular velocity proportional to the movement of said moving element, measuring degrees on said dial arranged in the form of a spiral the radius vector of which increases in proportion to the movement of said moving element and an indicator moving in a fixed radial path over said dial at a rate proportional to the movement of said moving element and equal to the change of radius vector of said spiral.

5. Apparatus of the type described which comprises, a dial having measuring intervals arranged in the form of a spiral of several turns, a main shaft, a pinion mounted on said main shaft, a moving element, a rack mounted on said moving element and meshing with said pinion, means for transmitting motion from said main shaft to said dial to give said dial a number of revolutions equal to the number of turns of said spiral as said moving element moves through its distance of maximum movement, an indicator moving across said spiral, and means driven from said main shaft for moving said indicator radially simultaneously with the rotation of said dial at a rate equal to the change in radius vector of said spiral.

6. Apparatus of the type described which comprises, a dial having intervals arranged in the form of a spiral of several turns, a main shaft, means for driving said dial from said main shaft, an indicator movable over said dial on a fixed line, a pinion mounted on said main shaft, a rack meshing with said pinion, and means for mounting said indicator on said rack.

7. Apparatus of the type described which comprises, a dial having measuring degrees arranged in the form of a spiral of several turns, a shaft, means for rotating said dial from said shaft, an indicator movable in a fixed line over said dial, a pinion on said shaft, a rack meshing with said pinion, means for guiding said rack and means for mounting said indicator on said rack.

8. Apparatus of the type described which comprises, a dial shaft, a dial mounted on said dial shaft and having measuring degrees arranged in the form of a spiral of a plurality of turns, a main shaft, a pinion on said main shaft, a moving element, a rack on said moving element meshing with said pinion, a gear on said main shaft and a gear on said dial shaft meshing therewith, said gears, rack and pinion being so proportioned as to rotate said dial a number of times equal to the number of turns of said spiral as said moving element moves through its maximum path of travel, a pinion on said main shaft, a slidable rack meshing with said pinion, and an indicator mounted on said rack in position to pass over said dial transversely to said spiral, said rack and pinion being so proportioned as to give said indicator a path of travel equal to the radial distance between the ends of said spiral.

9. Apparatus of the type described which comprises a dial having indicating degrees in the form of a spiral of several turns, a moving element arranged to rotate said dial a number of turns equal to the number of turns of said spiral, an indicator adapted to move in a path transversely to the turns of said spiral, said indicator being of a form so as to expose only one of said turns during said transverse movement, means for moving said indicator over said spiral at a rate proportional to the turning movement of said dial so as to follow the line of said spiral during said movement.

10. Apparatus of the type described which comprises, a dial having indicating degrees in the form of a spiral of several turns, a moving element arranged to rotate said dial a number of times equal to the number of turns of said spiral, an indicator moving over a line transverse to the turns of said spiral and exposing but one turn of said spiral at said line at one time, a casing covering said dial and indicator and having a window through which said indicator is visible, and means for moving said indicator on said line to continuously expose a portion of said spiral at said line as said dial rotates.

11. An apparatus of the type described, comprising a movable element, a disc-like dial for measuring the amount of movement of the said element, a shaft on which the said dial is rigidly mounted, a stationary frame revolubly carrying the said shaft, a scale arranged on the said dial in shape of a spiral of several turns equally distant from each other and having the axis of the said shaft as their common center, the distance of the ends of the said spiral being equal to the length of the movement of the said element and being situated on a radius drawn from the said shaft, degrees subdividing the said spiral, corresponding degrees situated on subsequent turns of the same being positioned on radii drawn from the axis of the said shaft at equal angles from each other, so that each interval between two successive degrees corresponds to one and the same subsection of the total movement of the said element, a rack connected to the latter, a pinion rigidly mounted on the said shaft, meshing with the said rack and having a pitch circle equal to the length of the movement of the said element divided by the number of turns of the said spiral, and a pointer fixed to a bracket mounted on the said element and arranged so as to simultaneously move along that line on which the ends of the said spiral are situated when the said element is at the end points of its possible movement.

12. An apparatus of the type described, comprising a movable element, a disc-like dial for measuring the amount of movement of the said element, a shaft on which the said dial is rigidly fixed, a stationary frame containing bearings in which the said shaft revolves, a measuring scale arranged on the said dial in shape of a spiral of several turns, the ends of the same indicating the limits of movement of the said element and being situated on a radius drawn from the axis of the said shaft, an opaque plate fixed to the said frame over the said dial, an opening provided in the said plate and extending across the said scale along that line on which the ends of the latter are situated, when the said element is at the end points of its possible movement, a pointer plate arranged to travel under the influence of the said element along the said line and consisting of a strip of opaque material longer and wider than the said opening, a window made of transparent material about as high as the degrees of the scale, having a dark line parallel to the latter and so placed in the said pointer plate, that, when the said element is at its zero point, the dark line indicates the zero point of the said scale, and gearing operatively connecting the said element with the said shaft in such a manner, that, when the said element traverses its whole course, the said dial makes as many revolutions as the said spiral has turns.

Signed at Saginaw, Michigan, this 28th day of Nov. 1923.

EUGENE GASE.